(12) United States Patent
Dimock

(10) Patent No.: US 8,504,418 B1
(45) Date of Patent: Aug. 6, 2013

(54) INCENTING ANSWER QUALITY

(76) Inventor: Benjamin P. Dimock, Poughkeepsie, NY (US)

( * ) Notice: Subject to any disclaimer, the term of this patent is extended or adjusted under 35 U.S.C. 154(b) by 0 days.

(21) Appl. No.: 13/596,384

(22) Filed: Aug. 28, 2012

Related U.S. Application Data

(60) Provisional application No. 61/673,501, filed on Jul. 19, 2012.

(51) Int. Cl.
*G06Q 30/00* (2012.01)
(52) U.S. Cl.
USPC .................................................... 705/14.19
(58) Field of Classification Search
None
See application file for complete search history.

(56) References Cited

U.S. PATENT DOCUMENTS

| | | | | |
|---|---|---|---|---|
| 2002/0087496 | A1* | 7/2002 | Stirpe et al. | 706/45 |
| 2007/0160970 | A1* | 7/2007 | Kaplan | 434/350 |
| 2007/0219794 | A1* | 9/2007 | Park et al. | 704/246 |
| 2007/0219795 | A1* | 9/2007 | Park et al. | 704/246 |
| 2007/0219863 | A1* | 9/2007 | Park et al. | 705/14 |
| 2007/0219958 | A1* | 9/2007 | Park et al. | 707/3 |
| 2009/0125598 | A1* | 5/2009 | Sun et al. | 709/206 |
| 2009/0186690 | A1* | 7/2009 | Toth et al. | 463/25 |
| 2010/0191686 | A1 | 7/2010 | Wang et al. | |
| 2010/0235311 | A1 | 9/2010 | Cao et al. | |
| 2010/0235343 | A1 | 9/2010 | Cao et al. | |
| 2010/0332261 | A1* | 12/2010 | Schoenberg | 705/3 |
| 2011/0106895 | A1* | 5/2011 | Ventilla et al. | 709/206 |
| 2011/0131085 | A1* | 6/2011 | Wey | 705/14.16 |
| 2011/0275047 | A1 | 11/2011 | Gomes et al. | |

OTHER PUBLICATIONS

Angie's List (May 2000).*
Get Paid to Answer Questions, Get Paid to Websites.com, downloaded from the Internet on Aug. 28, 2012, http://www.getpaidtowebsites.com/get-paid-to-answer-questions.php, 4 pages.

* cited by examiner

*Primary Examiner* — Rutao Wu
*Assistant Examiner* — Michael Cross
(74) *Attorney, Agent, or Firm* — Fish & Richardson P.C.

(57) ABSTRACT

Methods, computer program products, and systems are described for online content management. Online content in the form of answer sets are exposed to a user posing a question to a question and answer service. The question and answer service causes an award amount to be debited from an account associated with the user. The question and answer service receives a user input that (i) selects one or more answers from the answer set, and (ii) specifies a distribution of a portion of the award amount among the selected answers.

17 Claims, 9 Drawing Sheets

Should I live in DC, MD, or VA? ⤴ 206

Number of Answers: 32
Total Amount Paid for Access: $400.10   ⎫
Unawarded Access Fees: $0.10            ⎬ 302
Average Quality: 4.5                    ⎭

| Date | UserID | Award Total | Quality Rating |
|---|---|---|---|
| 5/25/2010 | Amblue10 | $105 | ★ |
| 9/10/2011 | EstateGuru | $250 | ★★★ ☆ |
| 11/1/2011 | Tourista | $45 | ★★★ ★☆ |

304 (brace over Quality Rating column)

INCENTING ANSWER QUALITY

CROSS-REFERENCE TO RELATED APPLICATION

This application claims the benefit of U.S. Provisional Patent Application No. 61/673,501, filed Jul. 19, 2012, which is incorporated herein by reference.

TECHNICAL FIELD

This specification generally relates to a service that provides high quality answers to questions. For instance, an online service can incent users to answer questions, and can enable other users of the system to locate quality answers in which the other users may have an interest, and to determine which users generally provide the highest quality answers.

BACKGROUND

Question and answer services generally allow users to post questions, or to access questions or answers that were previously posted by other users. Typically, any user of a question and answer service can leave a comment or an answer in response to a question. A user can respond to a question with a bona fide answer, a comment, another question, an emoticon, symbols, nonsensical information, spam, or with any other response. While some answers are useful to the user that posed the question, others may not be.

SUMMARY

This document describes techniques for providing high quality answers to questions in an online service. Users of the online service can be questioners and/or answerers that provide either original content or reviews or comments concerning the content provided by other users. The systems here may provide tools to assist in content creation and submission as well as tools for managing user reputations (e.g., as determined by reviews that other users provide for content). In addition, various mechanisms may be provided to reward answerers for submitting high-quality content, including financial awards. Implementations of the methods, computer program products and systems can include one or more of the following features.

In one implementation, methods, computer program products, and systems are disclosed. The method includes exposing, to a user of a question and answer service, an answer set for a question chosen by the user, and causing, by the question and answer service, an award amount to be debited from an account associated with the user. The method also includes receiving a user input that (i) selects one or more answers from the answer set, and (ii) specifies a distribution of a portion of the award amount among the selected answers, and causing, by the question and answer service, the portion of the award amount to be distributed to one or more other users associated with the selected answers according to the distribution.

In some implementations, the method also includes, in response to receiving the user input, causing, by the question and answer service, another portion of the award amount to be credited to an account associated with an operator of the question and answer service. The other portion may represent a vigorish. The method further includes causing, by the question and answer service, a remainder of the award amount that is not distributed to the one or more other users to be credited to an account associated with an operator of the question and answer service.

In some implementations, the method can also include presenting a representation of the metadata associated with the answer set before the answer set is exposed. In some implementations, the answer set comprises two or more responses to a question compiled by the question and answer service.

In another implementation, the method includes storing user-supplied information as metadata in association with all of the answers in the answer set. In some implementations, the method includes storing user-supplied information as metadata in association with one or more of the selected answers of the answer set.

In another implementation, a computer-implemented system is disclosed. The system includes one or more computers and one or more storage devices storing instructions that are operable, when executed by the one or more computers, to cause the one or more computers to perform operations. The operations include (a) exposing, to a user of a question and answer service, an answer set for a question chosen by the user, (b) causing, by the question and answer service, an award amount to be debited from an account associated with the user, (c) receiving a user input that (i) selects one or more answers from the answer set, and (ii) specifies a distribution of a portion of the award amount among the selected answers, (d) causing, by the question and answer service, the portion of the award amount to be distributed to one or more other users associated with the selected answers according to the distribution, and (e) causing, by the question and answer service, a remainder of the award amount that is not distributed to the one or more other users to be credited to an account associated with an operator of the question and answer service.

Implementations of the system can also include providing an answer set that comprises two or more responses. In addition, the system-provided two or more responses within the answer set can originate from users of an online community. The system can also include offering to the user of a question an opportunity to update the answer set with further topical information.

The details of one or more embodiments are set forth in the accompanying drawings and the description below. Other potential features and advantages will be apparent from the description and drawings, and from the claims.

DESCRIPTION OF DRAWINGS

FIG. 3 is a screenshot showing a selected question and associated metadata.

Like reference symbols in the various drawings indicate like elements.

DETAILED DESCRIPTION

Figure 1:
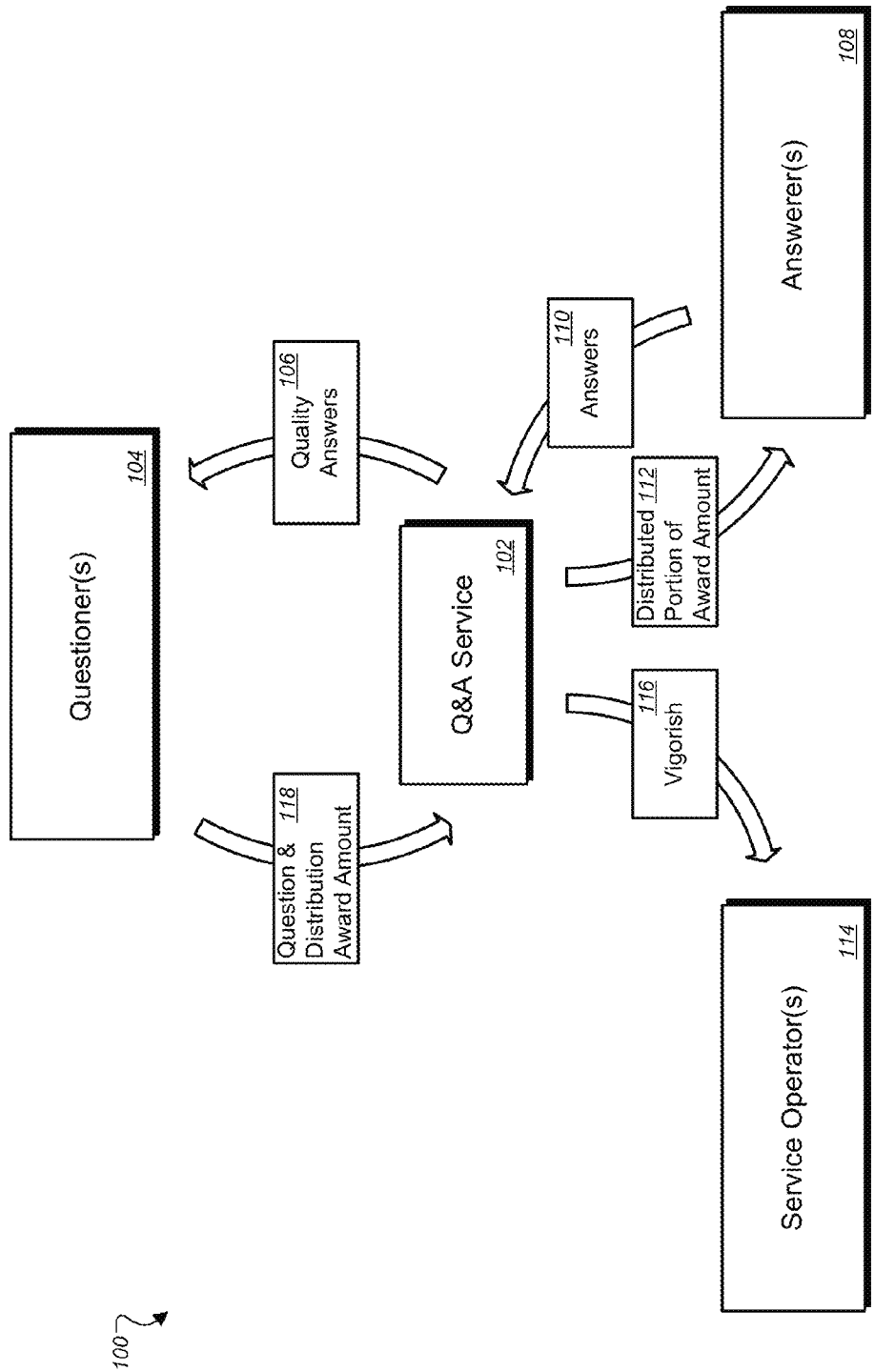
FIG. 1 is a conceptual diagram showing an example system for incenting users to provide quality answers to questions.

This specification describes techniques, methods, and systems for providing an online system to incent users to access and share high quality content. In certain implementations, the online system is an online question and answer service that enables questioners to ask questions, and that incents answerers to answer questions. Such a question and answer service organizes and collectivizes answers to questions that users (specifically, "answerers") have been provided to the service.

At a later time, users seeking answers to questions (specifically, "questioners") can access the collectivized answers (e.g., answer sets) by entering a question, or by entering terms or queries, and choosing to pay a fee to view a corresponding answer set. After viewing the answer set, these users can quickly deduce which answers might provide high quality information, and can distribute a portion of the fee to the answerers that entered the highest quality answers. The questioners can access the question and answer service to avoid having to scour the internet for quality answers pertaining to a question.

In one illustrative example, a questioner who wishes to access the collectivized answers can enter one or more terms into control (e.g., a text entry field) on a graphical user interface of the question and answer service. In response, the question and answer service can display a number of possible questions that may pertain to the entered terms. The questioner can select a particular question, and can be provided with a representation of an answer set pertaining to the selected question. In another example implementation, the questioner can enter the question itself.

One example representation of an answer set may include a partially obscured or occluded answer set alongside a number of user reviews or other metadata pertaining to the answer set. In another example representation, user names, past awarded payments, and/or quality ratings can be displayed alongside a partially or fully occluded answer set. Other combinations of answer set content are possible. The question and answer service can allow the questioner to view more information in an answer set by providing, to the questioner, an option to submit payment to view some or all of the answers of the answer set.

The question and answer service is configured to collect both questions and answers from a number of users. Users of the question and answer service include both questioners and answerers. Any user can be both a questioner and an answerer in the question and answer service. Both questioners and answerers may have access to the question and answer service using an account with a username and password.

In general, questioners can enter or select terms or questions in a graphical user interface of the question and answer service. In response, the questions can be "answered" by answerers that have access to the question and answer service. Updates to both submitted answers and submitted questions can be provided by the original questioner or answerer, or by other authorized user of the service. For example, a questioner can be provided an opportunity to become an answerer for purposes of updating an answer set with further topical information.

Answerers can provide answers to questions that are entered into the question and answer service. Answers generally include user-generated content entered by the answerer that attempts to provide a "best answer" for a particular topic. As such, the provided answers include a number of user-formatted entries of varying complexity in response to a particular question. Such a set of answers to a single question is referred to herein as an "answer set." The answer set can be generated over time as additional answerers attempt to answer a particular question. In other example implementations, answers to questions can be generated automatically, e.g., by a 'bot,' without the involvement of a human answerer.

Each answer set may include one or more answers or related content relating to a particular question, where the answers may be uploaded by different users and/or appended by the question and answer service. In some implementations, the content in the answer sets may also be of various other forms of user-submitted content or metadata that is available to other users in a community, including, but not limited to notes, comments, starred reviews, symbols indicating reviews of the content, and metadata related to the content or metadata pertaining to the user entering the content.

The answer sets may also include nonsensical or nonresponsive answers, or spam. As described in more detail below, the metadata that is shown to questioners can allow the questioners to easily filter out these types of responses when reviewing an answer set. Answer sets may be analyzed by spam filtering processes to delete spam answers or otherwise unhelpful answers.

Advantageously, the described system may provide for one or more benefits, such as enabling users to access quality information quickly because other users have taken the time to pre-analyze, review, and or manually narrow a list of acceptable answers to various questions. In addition, the described system accomplishes providing quality answer sets in a manner that can be organized to enable other users of the system to locate quality content in which they may have an interest and to additionally determine which authors generate the best content.

FIG. 1 is a conceptual diagram showing an example system 100 for incenting users to provide high quality answers to questions. The high quality content typically includes questions and answers to such questions, but can also include other online content such as review data, metadata, reference data, symbolic data, user account data, payment data, or any combination of the above.

At a high level, the system 100 is configured to provide a collaborative question and answer service 102 for users. The question and answer service 102 is a tool that hosts and mediates an information marketplace. The unique structure of which marketplace serves the twofold purpose of, firstly, incenting participation and quality answer content, and secondly, providing an intrinsic and reliable indicator of the quality of that content. The information marketplace hosted by the question and answer service can be configured to charge access fees to provide users access to a given question's answer set, and subsequently mandate distribution of that fee (less a commission paid to the service itself) to one or more answerers of the question within a certain period of time.

In one example, some users of system 100 are questioners 104, to which the question and answer service 102 provides quality answers 106. Questioners 104 typically include users that perform online research to obtain detailed information on a particular topic. Such online research can be performed in the form of search queries entered on search engines such as YAHOO, GOOGLE, BING, etc., or on secondary sites such as WIKIPEDIA, FANDANGO, AMAZON, etc.

In another example, some users of system 100 are answerers 108. Answerers 108 can provide answers to questions stored within the question and answer service 102. In response to an answerer 108 providing an answer 110 to an existing question, the question and answer service 102 can provide payment 112 to the answerer 108, as a payment for initially answering a question and/or as a portion of an award amount distributed as a result of a questioner viewing an answer set that includes an answer to a question. Payment 112 may be in the form of an award amount representing an actual cash value. In some implementations, payment 112 is offered as an accrual of points, rather than paid as an actual cash value.

The question and answer service 102 is configured to store any number of answer sets, in which each answer set pertains to a particular, user-selected question. In some implementations, similar questions may each have their own unique answer set, or similar questions may be associated with a single answer set. For example, the questions "Should I live in Maryland or Virginia?" and "Should I live in Virginia or Maryland?" may have their own answer sets, or may be associated with the same answer set.

Along with the answer sets, metadata can be added by the system 100. For example, the system 100 can append, to answers, answer sets, or user accounts, metadata that provides statistics for the answer sets and related users. In another example, users of the system 100 can upload data to be stored with one or more particular answer sets. The system 100 can access the uploaded data and store all or a portion of such data as metadata in association with other answers or answers sets. In some implementations, the metadata can be stored in association with all of the answers in a particular answer set. In other implementations, the metadata can be stored in association with one or more of the selected answers of an answer set.

The system 100 includes one or more service operators 114. Service operators 114 can provide a host of infrastructure support to the question and answer service 102. The service operators 114 may be external vendors who provide services or information to the question and answer service 102. For example, service operators 114 can provide account management support for accessing the question and answer service 102, which may include online account setup, transactional services, award management, quality/review management, and/or content management. In some implementations, the service operators 114 can handle transactions between users and the question and answer service 102 and collect a vigorish 116 (or "vig") for the services rendered. The vigorish 116 may represent a predetermined commission amount set by the question and answer service 102 for utilizing such services.

In operation, the question and answer service 102 can receive answers 110 from answerers 108. The answers 110 may be one of several answers to a particular question and can originate from a number of unique users. That is, multiple users can access question and answer service 102 to provide answers to questions. Answers 110 can be collected, organized, and stored within the question and answer service 102. In some implementations, answers 110 can be updated by other users who may have additional data or differing data pertaining to the particular question. The question and answer service 102 can generate answer sets from answers 110, for example. Each answer set may be a collection of answers 110 that provide information related to a particular question.

At some time after one or more of the answers 110 have been collected, a questioner 104 can submit one or more user-entered terms to the question and answer service 102. The user-entered terms can include search queries, search terms, prefixes, keywords, questions or portions of questions, partial words, and/or address information, just to name a few examples. Upon receiving the user-entered terms from questioner 104, the question and answer service 102 can access one or more questions associated with the user-entered terms and present the one or more questions to the questioner 104. For example, the question and answer service 102 can expose, to the user of the question and answer service, multiple questions matching one or more of the keywords entered by the user. The questioner 104 can select a question and be presented with a corresponding quality answer set 106, for example.

After the question and answer service 102 presents the quality answer set 106, the questioner 104 can select an answer within answer set 106. In some implementations, the question and answer service 102 requests that the questioner pay a fee to gain access to view the entirety of one or more of the answers within the answer set 106. The fee is typically split into a vig 116 and a distribution award amount 118. In some implementations, a vig 116 is not distributed to the service operators 116, i.e., the vig 116 has a value of $0.00.

The distribution award amount may represent the amount of payment left after the vig is paid to the service operators 114. If the questioner 104 wishes to view one or more of the answers within the answer set 106, and additionally she agrees to pay the fee, the question and answer service 102 debits the fee (i.e., the vig and the distribution award amount) from an account associated with the questioner 104.

Once the questioner 104 is given access to the answer set 106, the questioner 104 can peruse the answers within the answer set 106 to determine which answer, if any, provides an acceptable or best answer. The questioner 104 can select one or more answers within the answer set 106. At this point, the questioner 104 can specify how to distribute any remaining award amount to one or more answerers that provided the answers. For example, the questioner 104 can determine that three answers (not shown) within the answer set 106 are acceptable, but note that one of the answers provides additional content for related topics to continue research.

Based on the additional content, the questioner 104 may be of the opinion that the answer with the additional content is superior to the other two answers and as such, the questioner 104 can specify to award a greater portion of the award amount to the presumed superior answer. In some implementations, the questioner 104 can award the entirety of the remaining award amount to the presumed superior answer. In other implementations, the questioner 104 can distribute the award amount evenly amongst a number of answers within the answer set 106. In yet other implementations, the questioner 104 can award the award amount as she sees fit amongst a number of the answers within the answer set 106.

Upon receiving the questioner's 104 selection of one or more answers and award distribution, the question and answer service 102 can cause one or more portions of the award amount 112 to be distributed to one or more answerers 108, according to the questioner's 104 specified distribution. In some implementations, the questioner 104 chooses to distribute zero of the award amount or leaves a remainder of award amount in the questioner's account.

In either case, if a remainder of award amount exists, the question and answer service 102 can credit the remainder of the award amount that is not distributed to one or more other accounts associated with an operator of the question and answer service 102. For example, the question and answer service 102 can credit the remainder of any unallocated award amount to a service operator 114. Alternatively, the question and answer service 102 can credit the remainder of any unallocated award amount to itself.

In some implementations, the questioner can additionally provide ratings for an answer set. For example, while the questioner 104 is determining how to distribute award amounts, she is generally in the mindset for determining the quality of the answers in the answer set. At this point, the questioner can add quality ratings or other metrics such as star ratings, percentages, thumbs up/thumbs down, comments, grades, and so on. These ratings can provide valuable information for other questioners using service 102 in the future. For example, other questioners can view high ratings or low ratings and choose determine whether an answer set is worth paying an access fee.

In some implementations, the question and answer service 102 automatically calculates a quality rating based on the distribution award amounts awarded by a number of questioners. For example, if the question and answer service 102 determines that answers written by a particular user commonly receive over half of the award amounts available, the question and answer service 102 can use that information to provide questioners information that certain answers may contain highly regarded data. The questioner can quickly determine to access answers provided by the particular user who commonly receives over half of the award amounts and forego reviewing answers in the answer set that were provided by other users.

In the examples described herein, user-applied ratings are not necessarily limited to quality ratings or award payments. For example, user-applied ratings can pertain to the amount of content available within a particular answer set. Here, more information available in one place may be desirable to a questioner looking to do research for a thesis paper as more content can provide the user with more avenues with which to expand on her thesis idea. In another example, the user-applied ratings may pertain to the reputation of the author (e.g., answerer) who provided the content. In yet another example, the user-applied ratings may pertain to the number of updates received for a particular answer set. Seeing that several updates have been made to the answer set can suggest to a questioner that the topic has been perused by several viewers and is therefore updated for accuracy and/or updated with additional useful data.

Figure 2:
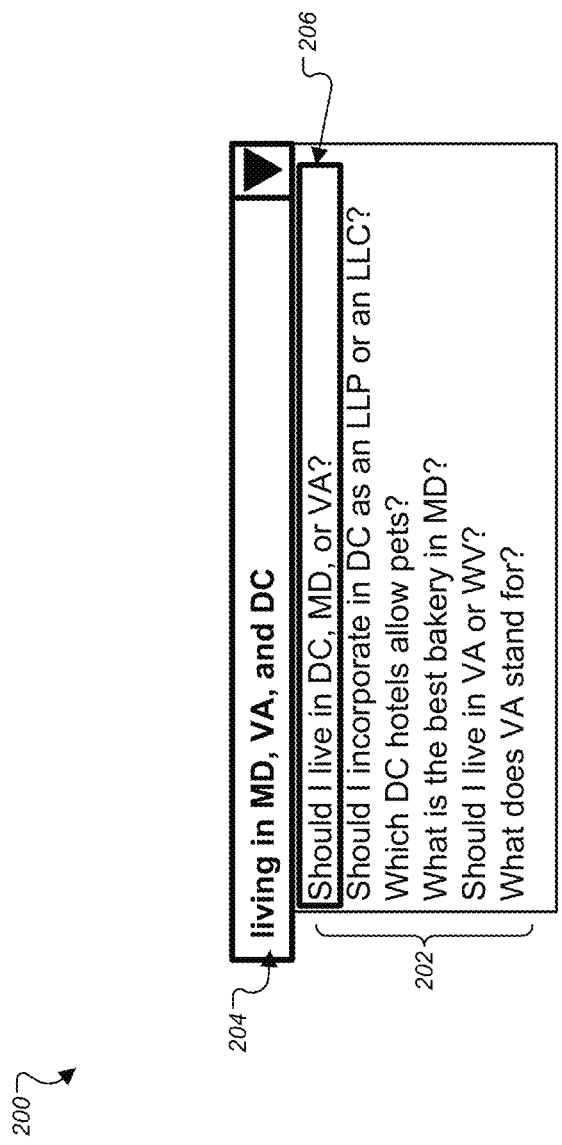
FIG. 2 is a screenshot of a text entry box containing previously submitted questions.

FIG. 2 is a screenshot of a text entry box 200 containing previously submitted questions 202. The text entry box 200 may be a control on a web page hosted by the question and answer service 102, for example. In some implementations, the text entry box 200 is provided as part of a standalone application, such as a mobile app. In some implementations, the text entry box 200 is rendered as part of a web search site.

The text entry box 200 can present a number of questions as part of a text entry control with dropdown functionality. In some implementations, specific questions are presented to users because the service 102 determines the questions 202 pertain to similar ideas or variations on of user-entered terms 204. In some implementations, questions are presented to users based on keyword similarity. As an example, in FIG. 2, a questioner has entered the terms "living in MD, VA, or DC?" 204. In response to the user-entered terms 204, the question and answer service 102 has provided the questions 202 based on those questions 202 sharing one or more keywords with the user-entered terms 204. In particular, the terms "DC", "MD", "VA," and "live" are featured in a number of the questions 202.

In this example, the questions 202 presented have been previously submitted by other questioners utilizing the question and answer service 102. Here, the questions include (i) "Should I live in DC, MD, or VA?" (ii) "Should I incorporate in DC as an LLP or an LLC?" (iii) "Which DC hotels allow pets?" (iv) "What is the best bakery in MD?" (v) "Should I live in VA or WV?" and (vi) "What does VA stand for?". Each of the presented questions 202 may include at least one overlapping keyword with the questioner's original user-entered terms 204 of "living in MD, VA, or DC?"

In some implementations, a question that exactly matches the questioner's entry is available in system 100 and can be presented upon receiving a user's selection. For example, if the user-entered terms make up a question, the system 100 may find an exact match of the user entry. In a similar fashion, the system 100 can determine that some variation of the questioner's terms are available and can provide one or more selectable questions related to the variation of the terms. In some implementations, questions are presented that relate to similar genres or topics included in the questioner's terms.

After entering the one or more terms 204, and receiving a number of selectable questions, the questioner 104 can peruse the list of provided questions to ultimately access an answer set pertaining to the terms 204. As shown in FIG. 2, the questioner selected question 206 "Should I live in DC, MD, or VA?," likely because question 206 represents the user-entered terms 204 accurately and is simply asked in a different form. In some implementations, the questioner can type in the question itself, instead of search for questions using keywords.

Upon selecting the question 206, the questioner is presented with additional information. FIG. 3 is an example screenshot 300 showing the selected question 206 and associated metadata 302. The associated metadata 302 can be collected and/or calculated by the question and answer service 102. The screenshot 300 includes metadata related to a total number of available answers in the selected answer set. In this example, the available answers total thirty two. The metadata for a total amount paid for accessing answers in the answer set is also shown. Here, the question and answer service calculated an amount of $400.10 has been paid by questioners so that they can view one or more answer within the set of thirty two answers. The metadata also shows that an amount of $0.10 is currently un-awarded.

The metadata 302 in screenshot 300 also includes quality data 304 associated with specific users. In particular, an average quality score for the answer set is shown as 4.5, while additional quality data 304 is shown for three separate users. These quality metrics can be calculated and regularly updated by the question and answer service 102. For example, the service 102 can recalculate quality scores for specific users based on new quality data entered or based on receiving new or additional user-uploaded content. In some implementations, award information can be displayed indicating a user's specific gross award distributions.

The quality data 304 includes quality ratings and award totals for a number of users. In particular, the user "Amblue10" is associated with an award total of $105 indicating that questioners have awarded the user "Amblue10" with $105 in awards over time for that user's answers to this question. The user "Amblue10" is associated with a quality rating depicted, in this example, as a star rating. The star rating for the user "Amblue10" is shown as five stars out of five stars, indicating that the user "Amblue10" is associated with high quality answers. In fact, as shown in FIG. 3, the user "Amblue10" is the quality leader amongst the depicted users.

In a similar fashion, the user "EstateGuru" is associated with an award total of $250 and a quality rating of four and a half stars out of five stars, indicating that the user "EstateGuru" is the award leader, but has a quality lower than the user "Amblue10." Both the award total and quality rating metrics can be utilized by questioners attempting to determine the best answer set for selection. For example, a questioner can compare the depicted quality ratings 304 amongst a number of users to select which user she thinks might provide the best answer set for the questioner's needs.

For example, the questioner can decide that the quality rating is the most important metric and may select an answer set associated with the user "Amblue10" based on the user "Amblue10"'s high quality rating. The questioner can alternatively decide to select an answer set associated with the user "EstateGuru" because the user "EstateGuru" is a leader in award amounts received. Other quality metrics can be accessed, presented or configured for presentation if, for example, other metrics, comments, indicators, or inputs are available for a particular user or answer set. The questioner may also deduce from this metadata that, because the user "Amblue10"'s answer has a higher quality score but lower award total, that their answer was provided more recently than the user "EstateGuru"'s answer.

Figure 4:
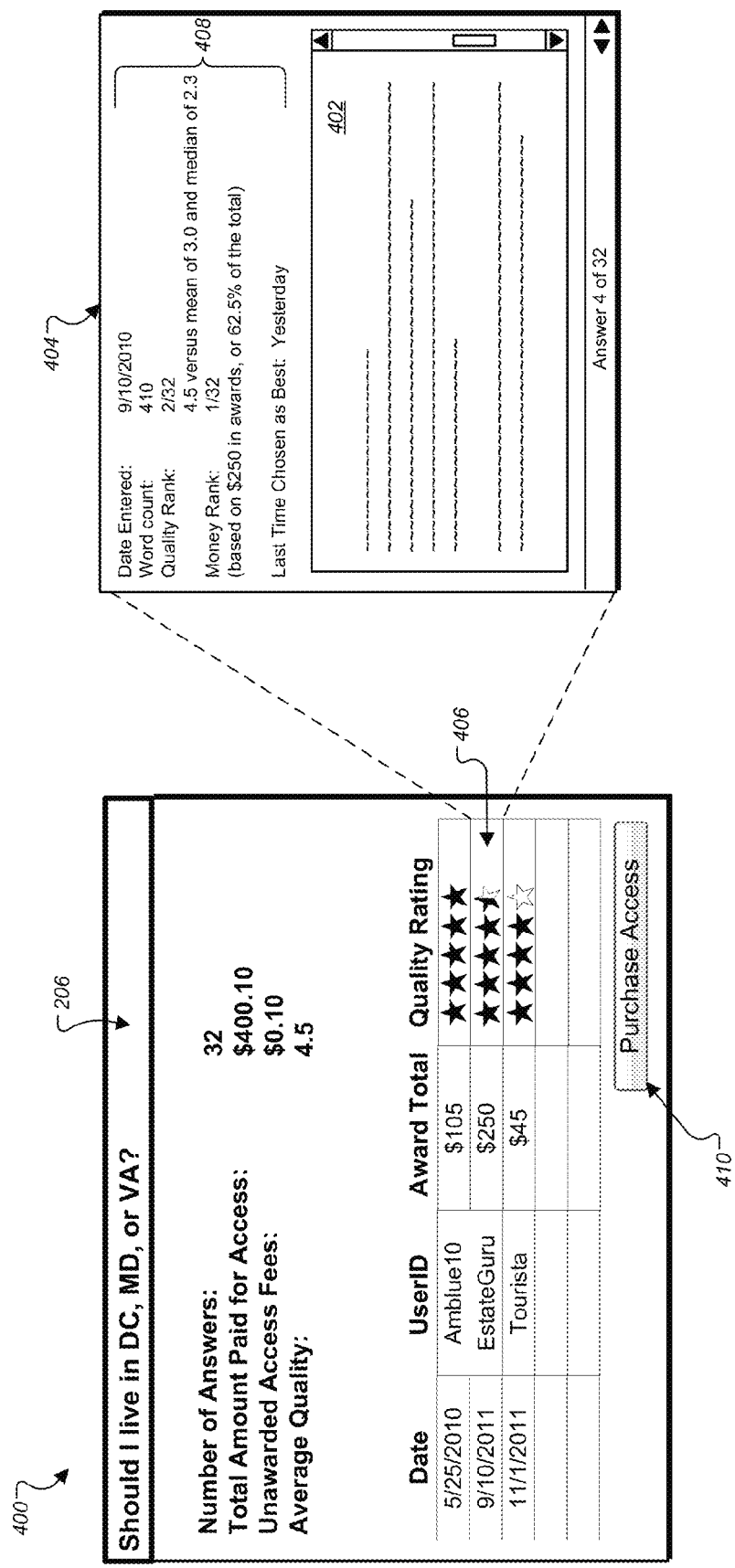
FIG. 4 is a screenshot showing an obscured answer to the selected question.

FIG. 4 is a screenshot 400 showing an obscured answer 402 to the selected question 206. The obscured answer 402 can be one of many selectable answers within an answer set. In some implementations, all answers in the answer set may be obscured. The selectable answers generally all pertain to some aspect of the selected question 206. As shown in FIG. 4, the questioner has selected to view more information on an answer drafted by the user "EstateGuru" 406. In response, the question and answer service 102 generated a pop-up screen 404 to show the obscured answer 402 along with some additional metadata 408. The additional metadata 408 is a representation of information associated with one or more answers within the answer set. In this example, the metadata is associated with answer four of thirty-two. In some implementations, the metadata 408 represents information associated with the entire answer set.

In the depicted example screenshot 400, the metadata 408 includes a date of entry of Sep. 10, 2010 for an answer submitted by the user "EstateGuru." The metadata 408 also includes a word count of 410 words and a quality rank of two out of thirty-two answers. Additional qualification data is provided for the quality rank. For example, metadata 408 includes indicating that the user "EstateGuru" is ranked for quality at 4.5 versus a mean of 3.0 and a median of 2.3 over the other answers in the set. The metadata 408 further includes a money ranking of 1/32 indicating that the user "EstateGuru" ranks first in award total received. Other qualifying data is shown indicating that the money ranking metric is based on $250 in awards, or 62.5% of the total amount awarded. In addition, the metadata 408 provides questioners with a "Last Time Chosen as Best" metric. In this example, "yesterday" was the last time that the user "EstateGuru"'s answers were chosen as best answer.

The answer 402 is obscured because the questioner has yet to pay the fee for accessing answer data within the answer set. If the user determines that the user "EstateGuru"'s answer 406 likely contains a quality answer based on his quality ratings or award amounts, the questioner can select a purchase access control 410. Upon selecting the purchase access control 410, the question and answer service 102 can debit an amount, such as $0.10 from an account associated with the questioner. The amount of $0.10 represents an arbitrarily chosen amount for purposes of illustrating an example. The amount paid and other service charges may vary upward or downward of this amount depending on the content, service operator, or service provider, for example.

Once the user has agreed to purchase access to an answer set, the question and answer service 102 can automatically transfer $0.01 of the payment for the vigorish, which can then be sent to a service operator as a commission, for example.

The payment, as well as the transferred data regarding the payment information may be appended as metadata to one or more user accounts, answers, the answer set, or content within the answers or the answer set.

Figure 5:
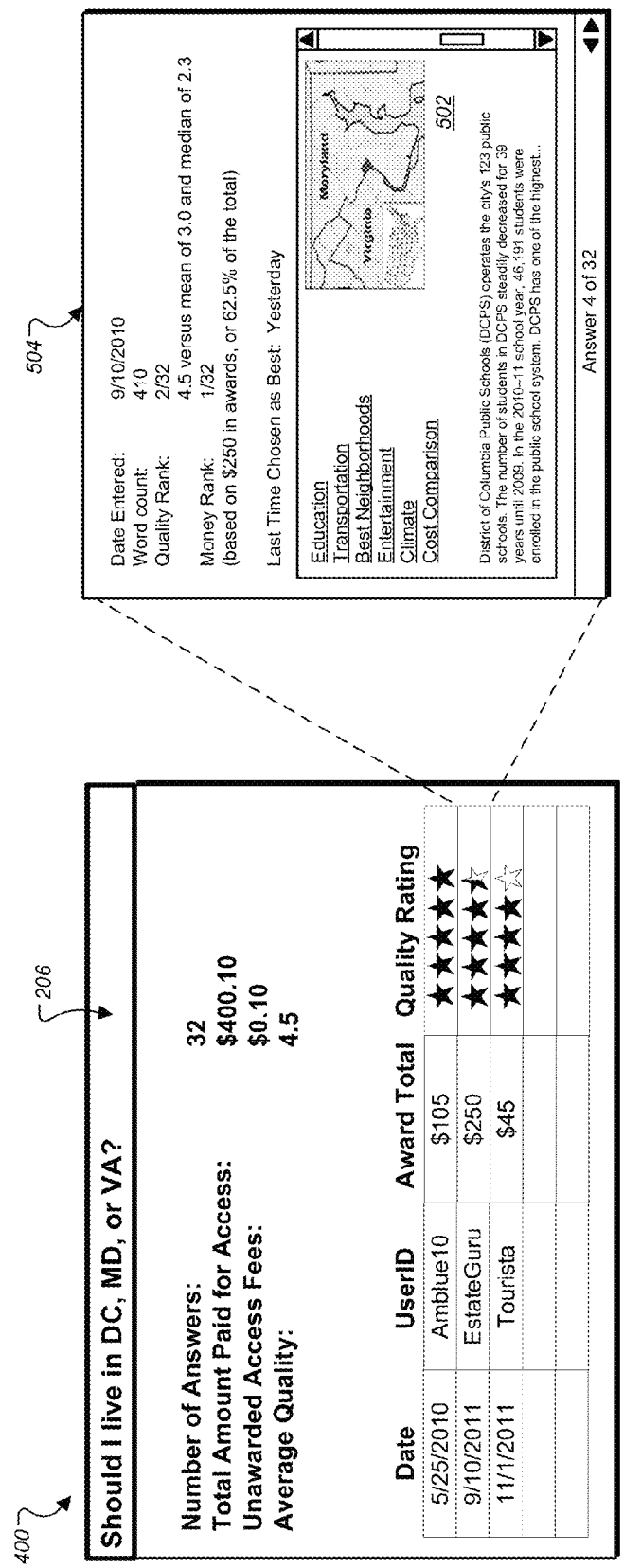
FIG. 5 is a screenshot showing an exposed answer set.

After receiving a user indication to purchase access to the answer set and receiving payment for access to the user "EstateGuru"'s answer 406, the pop-up screen 404 is populated with an exposed answer 502, as shown in FIG. 5. FIG. 5 is a screenshot showing the exposed answer 502 within an exposed answer set 504. The exposed answer 502 includes maps and links that have some relevance to the questioner's selected question 206. Namely, the exposed answer 502 represents the user "EstateGuru"'s attempt to answer the questioner's selected question 206. Once access is granted to answer set 504, the questioner can access any future updates that may occur to the answer set, i.e., as existing answers are updated or new answers are added.

Figure 6:
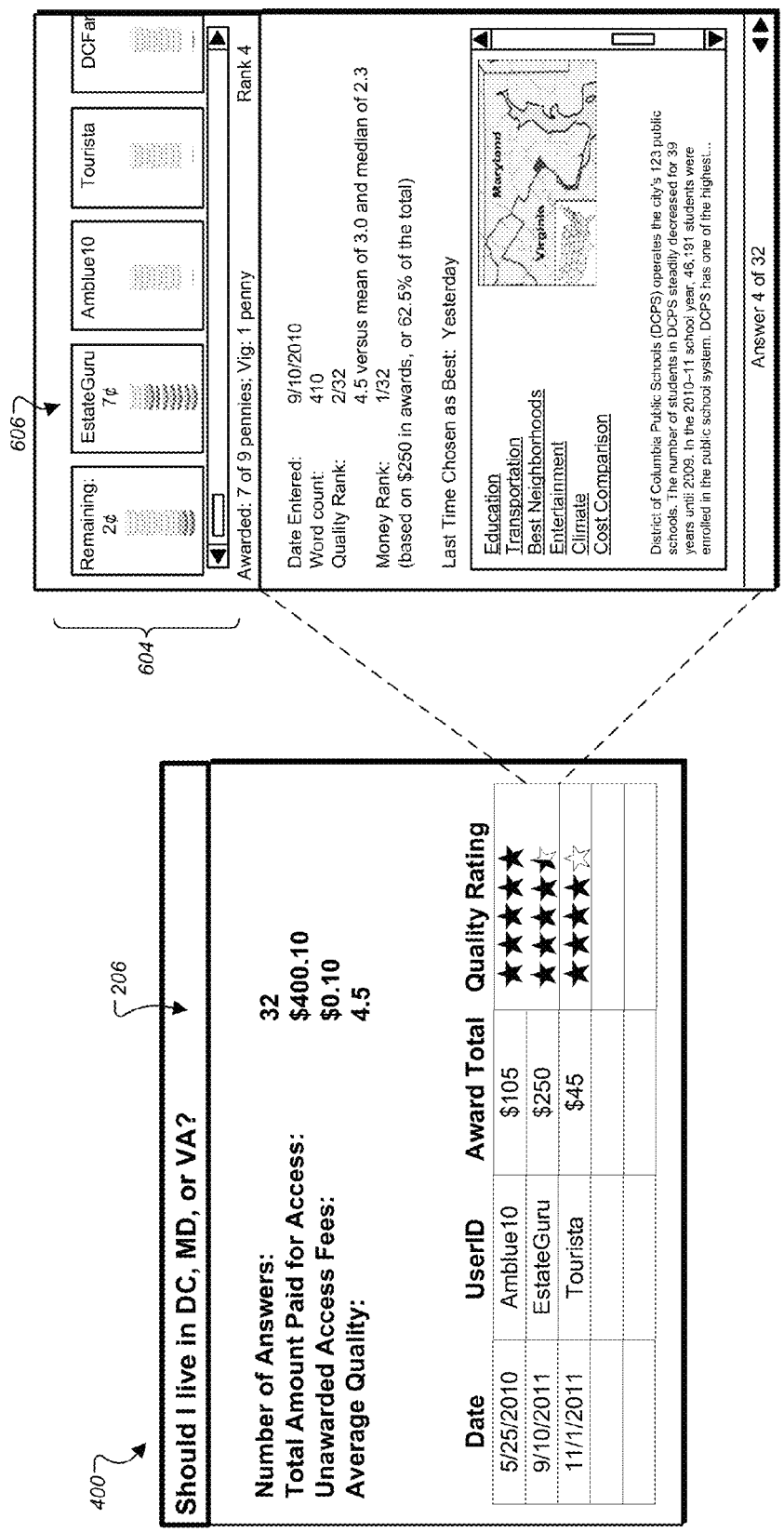
FIG. 6 is a screenshot showing an example of award distribution.

FIG. 6 is a screenshot showing an example of award distribution to users. This example graphically depicts awarding pennies to users as payment for being an answerer in the system 100, for example. Recall that the questioner in the example above paid in $0.10 to reveal an answer set. Of that amount, $0.01 was paid as a vigorish 602 to a service operator. The graphics 604 show that the questioner awarded $0.07 to the user "EstateGuru." Accordingly, seven coins are shown in the user "EstateGuru"'s award bank 606. The graphics 604 also show that the questioner has $0.02 left to be awarded.

Figure 7:
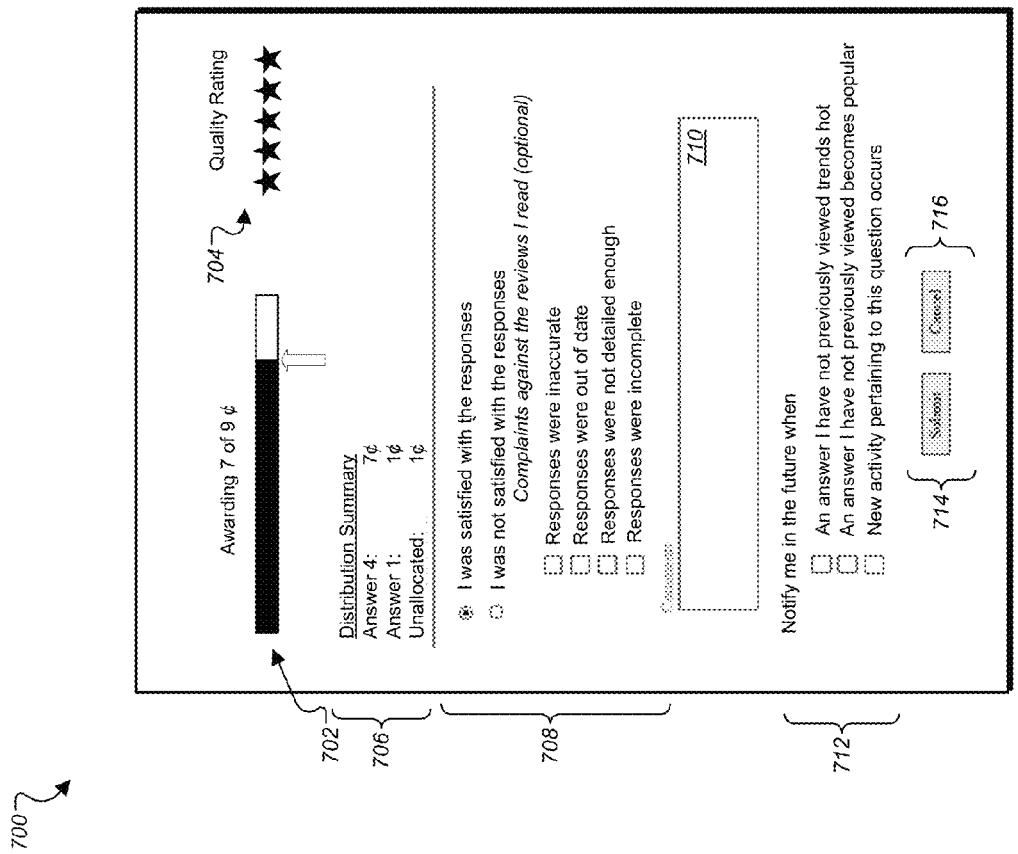
FIG. 7 is a screenshot showing the rating of information for an answer set.

FIG. 7 is a screenshot 700 showing the rating of information for a selected answer set. The screenshot 700 can, for example, be displayed when the questioner is determining award distributions for answerers that provided content in a particular answer set. In the depicted example, the graphic 702 illustrates that the questioner has just awarded seven of nine cents to a user. In addition, the questioner entered a five star quality rating, as shown by graphic 704. A distribution summary 706 indicates that the questioner has just awarded $0.07 to answer number four and previously awarded answer number one with $0.01, leaving an unallocated amount displayed as $0.01. Other summary details are possible as, for example, the questioner allocates more award amounts.

The questioner can also enter satisfaction input at 708. Satisfaction input can be retrieved from the questioner by requesting a checkbox input, such as the shown binary indication that requires that the user simply mark a checkbox as satisfied or not satisfied. In some implementations, other satisfaction indicators are provided to the questioner so that the question and answer service 102 can provide other users accurate metadata pertaining to an answer or answer set. In the depicted example, if the questioner marks that she is not satisfied with the responses, she can indicate that the response were inaccurate, out of date, not detailed enough, or incomplete, just to name a few examples. In some implementations, the questioner can be provided an option to add complaints or specific comments 710. The user-entered data in screenshot 700 can be stored with one or more users, answers, or answer sets so that the question and answer service 102 can provide quality statistics or information to other users accessing the same users, answers, or answer sets.

The screenshot 700 also includes an area 712 that allows the questioner to set up a number of notifications. For example, the questioner can indicate that she would like to be notified if an answer that she has not been previously viewed begins to trend upward. Similarly, the questioner can indicate that she would like to be notified if an answer that she has not been previously viewed becomes popular. Another notification option allows the questioner to indicate that she would like to be notified if new activity occurs that relates to her selected question. Other notification options are possible and screenshot 700 provides some examples of the capabilities of service 102.

The questioner can complete some or all of the content in screenshot 700 and choose to submit the data to question and answer service 102 by selecting submit control 714. Alternatively, the user can choose to forego providing a satisfaction review and/or selecting notification options by selecting a cancel control 716.

Figure 8:
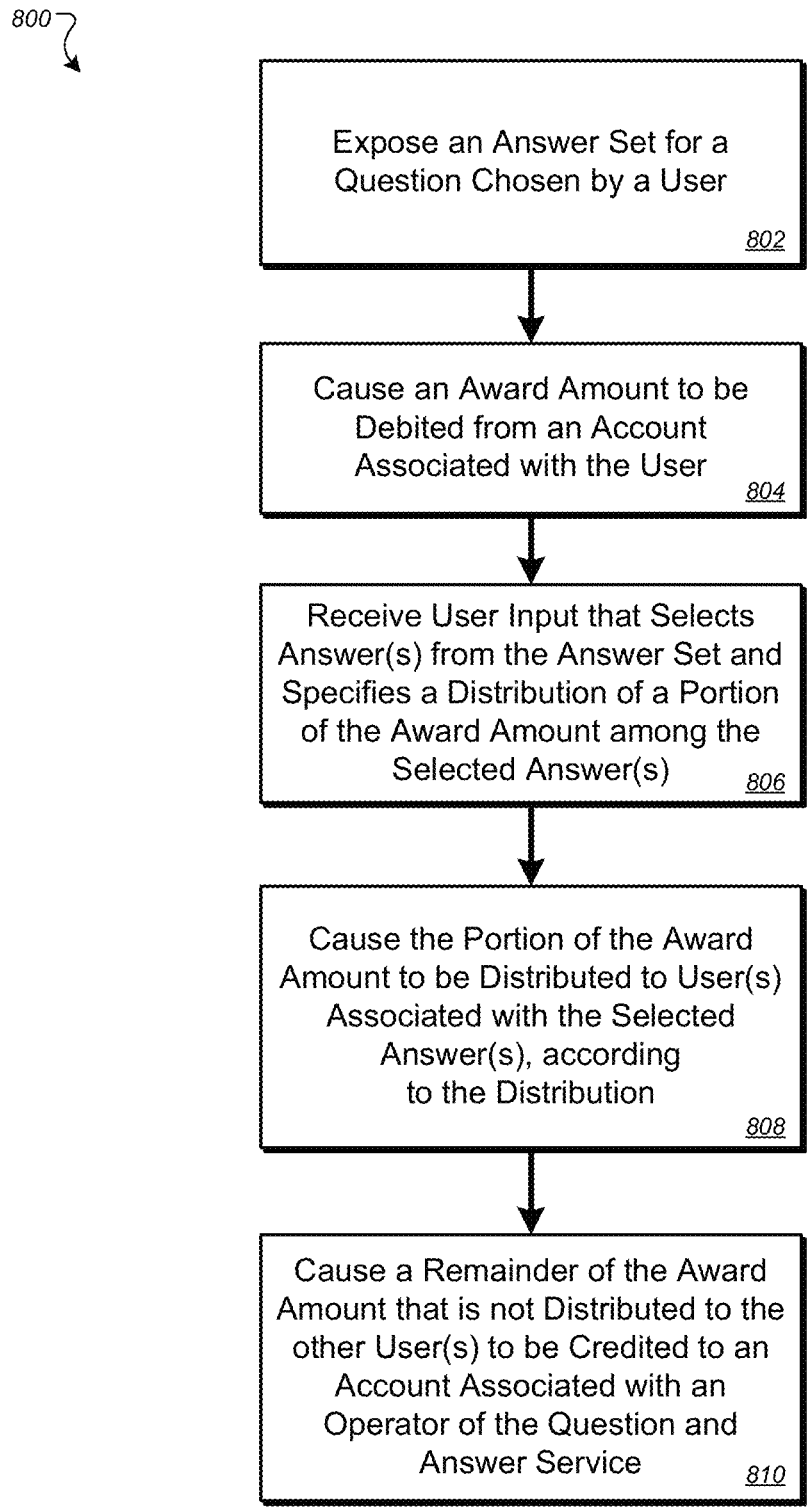
FIG. 8 is a flowchart of an example method showing actions taken to share and incent online content.

FIG. 8 is a flowchart of an example method 800 showing actions taken to share and incent online content. For convenience, the method 800 will be described with respect to a system (e.g., the question and answer service 102 in the system 100) that performs the method 800. The system can be implemented or associated with hardware components, software components, or firmware components, or any combination of such components. The system can, for example, be implemented or associated with general purpose servers, software processes and engines, and/or various embedded systems.

The question and answer service 102 exposes (802), to a user of a question and answer service, an answer set for a question chosen by the user. To receive such a list of questions, a user may have previously entered terms signifying the type of data the user wishes to see. For example, a user may enter one or more terms as a type of online search query. In such an example, the one or more user-entered terms might include "small business formation U.S.". In response, the question and answer service 102 can present a list of questions containing one or more of the terms that the user entered. In operation, the question and answer service can use the user-entered terms ("small business formation U.S.," in this example) to generate the list of questions that correlate to the topic(s) covered by the terms. Example questions may include, for example, "How do I start an orchard business in Georgia?" or "How do small businesses survive in the U.S.?" or "How do I incorporate my small business in the U.S.," just to name a few examples. The user can select one of the questions to review one or more answers.

In response to the presentation of the list of questions, the user can select a question in the list of questions that best matches the information the user is hoping to acquire. Upon selecting a particular question, the user may be presented with a screen that displays a number of answers, such as an answer set pertaining to the selected question. The user may also be presented with metadata that includes, among other things, a satisfaction metric based on previous user response to receiving the content in the number of answers. In this example, the answer set is hidden until the user "unlocks" the answer set by purchasing rights to view the answers.

If the user agrees to purchase rights to view the answer set, a commission or vigorish can be collected for the service operator 114, for example, and the remainder of the payment can be made available for the user to distribute award amounts to answerers. In operation, once the user agrees to purchase rights to view an answer set, the question and answer service 102 causes (804) an award amount to be debited from an account associated with the user. The award amount can be debited by one or more service operators 114. For example, the question and answer service 102 can send a request to the service operator 114 to indicate that an award amount has been received from the user (e.g., questioner 104). The service operator 114 can then initiate a communication with a financial institution over a secure network connection to move the award amount from the user's account to a question and answer service account.

The question and answer service 102 can provide the service operator 114 with financial institution information for a particular user by accessing the user's account information. In some implementations, the debit can be performed by the question and answer service 102 if, for example, service 102 manages the user accounts. The debit transaction can occur when the question and answer service 102 receives (806) a user input that selects one or more answers from the answer set along with an agreement to purchase the rights to view the answer set.

After the user has agreed to pay an access fee for an answer and reviewed at least one answer, the user can be asked to specify how to distribute portions of the award amount. The user enters her specifications for distribution and the question and answer service receives (806) the user input specifying a distribution of a portion of the award amount among the selected answers. In some implementations, the user can decide how to award one or more answerers based on the user's review of one or more answers in the answer set.

After the user determines how she wishes to distribute the award amounts, the question and answer service 102 causes (808) the portion of the award amount to be distributed to one or more other users associated with the selected answers according to the distribution. For example, if the user provided a payment of $1.00 to view a particular answer set, the question and answer service can deduct a commission of $0.15, for example, and allow the user to allocate the remaining $0.85 amongst one or more answerers that provided an answer to her question.

In the event that the user decides to only award a portion of the award amount, the question and answer service 102 can cause (810) any remainder of the award amount that is not distributed to the one or more other users to be credited to an account associated with an operator of the question and answer service. For example, the question and answer service 102 can automatically credit any remainder of an unallocated award back to the question and answer service 102. In such an example, the system 100 may impose a predetermined time limit in which to distribute awards. One example time limit may provide the user twenty four hours to distribute an award. If the user does not comply with the time limit restraint, the question and answer service 102 can automatically credit an operator of the service 102 with the remainder of the award amount.

In some implementations, the user (e.g., a questioner) can be provided an option to grudgingly allocate award amounts to answerers. An award amount that is grudgingly allocated can indicate that the user that was provided the award provided an answer, but the answer was still not that great in terms of quality. When an answerer is grudgingly allocated an award, this may indicate, for example, that a questioner was expecting a lengthy answer covering more aspects of her question, but instead notes that answers within the purchased answer set only provide her a narrow angle on the question. In such a case, it is possible that none of the answers adequately satisfy the questioner's expectations, so the questioner can deem what she thinks is the best answer available and then grudgingly allocate the award amount to that answerer.

Other questioners who encounter answers provided by users with grudgingly allocated award amounts can view that the award was provided grudgingly and determine that the answer may not be worth paying for. In addition, system 100 can provide statistics, such as answerer popularity rankings or answerer reputation scores, based on these grudgingly allocated awards. Such statistics can ensure users of the system 100 may have a clear way to determine if a particular answer set provided other users quality answers. For example, system 100 can determine not to increase a particular answerer's popularity ranking or reputation score based on a grudgingly allocated award. In some implementations, the system 100 can lower the answerer's popularity ranking or reputation score if too many awards are grudgingly provided.

Figure 9:
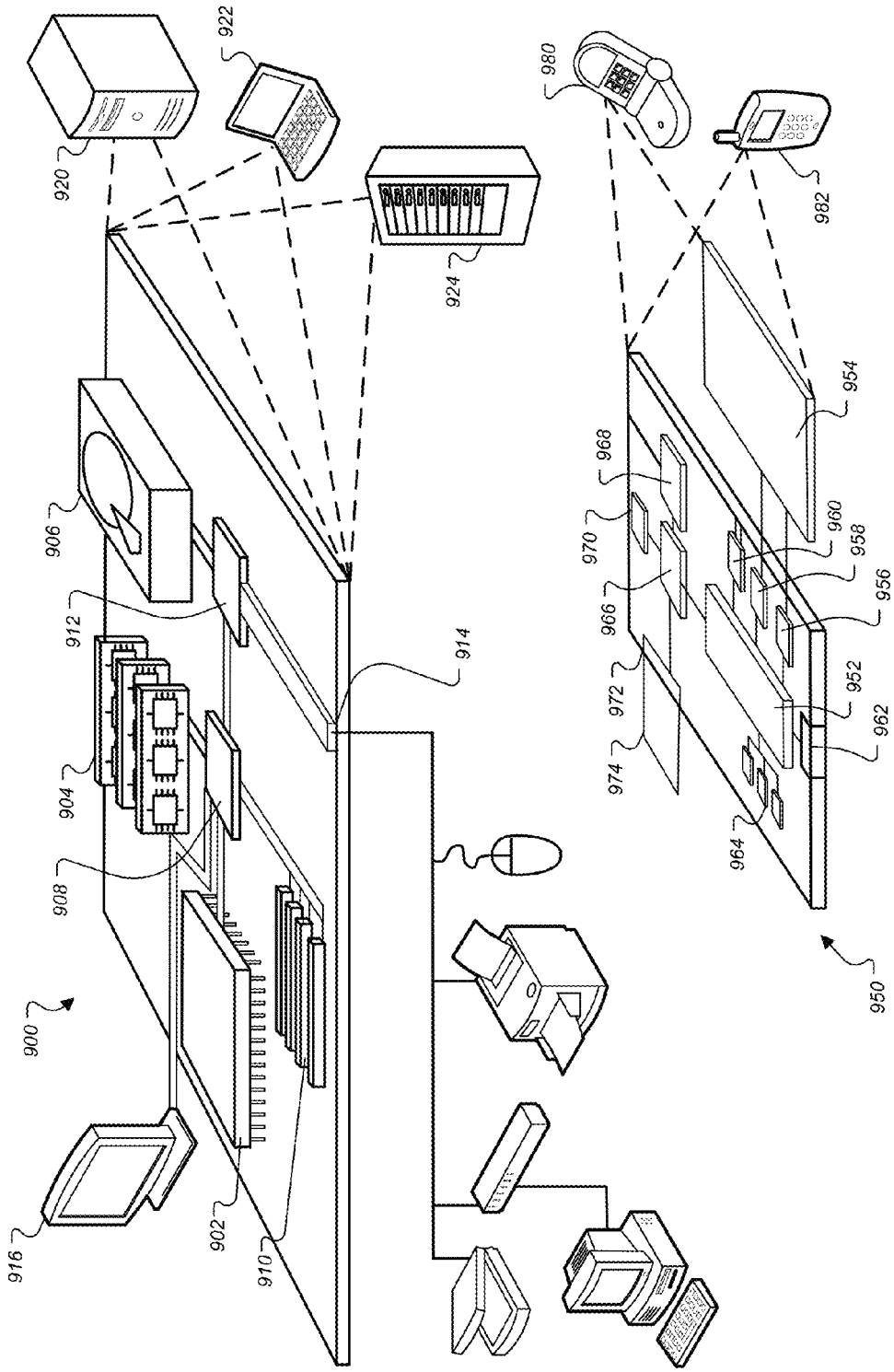
FIG. 9 is a schematic diagram of an example computer system.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
identifying, by one or more computers associated with a question and answer service, a user-selected question from among a searchable database of questions;
exposing, by the one or more computers and to a user that selected the question, information about an answer set for the user-selected question,
wherein, before payment for the answer set is received from the user, the information about the answer set includes information specifying a number of answers in the answer set, and, for each answer in the answer set, a total monetary amount that other users of the question and answer service have distributed to the answer, and does not include the content of any answer in the answer set, and wherein, after the payment for the answer set is received from the user, the information about the answer set includes the content of one or more answers in the answer set; and in response receiving the payment for the answer set from the user, initiating, by the one or more computers, a timed interval for receiving one or more user inputs that (i) select one or more answers from the answer set, and (ii) specify a distribution of a portion of the payment among the selected answers.

2. The method of claim 1, wherein, before payment for the answer set is received from the user, the information about the answer set includes information specifying, for each answer in the answer set, an aggregated rating that is based on ratings that have been applied to the answer by other users of the question and answer service who have distributed a portion of their payments to the answer.

3. The method of claim 1, comprising, in response to receiving the payment, automatically deducting a portion of the payment for the question and answer service before initiating the timed interval.

4. The method of claim 1, comprising:
determining that (i) the timed interval has expired and (ii) the user has not specified a distribution of the entire portion of the payment among the selected answers; and
in response to determining that (i) the timed interval has expired and (ii) the user has not specified a distribution of the entire portion of the payment among the selected answers, crediting a portion of the payment for which the user has not specified a distribution to an account associated with the question and answer service.

5. The method of claim 1, comprising:
receiving one or more keywords entered by the user before exposing the answer set; and
exposing, to the user of the question and answer service, multiple questions matching one or more of the keywords entered by the user.

6. The method of claim 1, wherein, in addition to specifying the distribution of the portion of the payment among the selected answers, the one or more user inputs further specify rating for one or more of the selected answers.

7. A system comprising:
one or more computers and one or more storage devices storing instructions that are operable, when executed by the one or more computers, to cause the one or more computers to perform operations comprising:
identifying, by a question and answer service, a user-selected question from among a searchable database of questions;
exposing, to a user that selected the question, information about an answer set for the user-selected question,
wherein, before payment for the answer set is received from the user, the information about the answer set includes information specifying a number of answers in the answer set, and, for each answer in the answer set, a total monetary amount that other users of the question and answer service have distributed to the answer, and does not include the content of any answer in the answer set, and
wherein, after the payment for the answer set is received from the user, the information about the answer set includes the content of one or more answers in the answer set; and
in response receiving the payment for the answer set from the user, initiating a timed interval for receiving one or more user inputs that (i) select one or more answers from the answer set, and (ii) specify a distribution of a portion of the payment among the selected answers.

8. The system of claim 7, wherein, before payment for the answer set is received from the user, the information about the answer set includes information specifying, for each answer in the answer set, an aggregated rating that is based on ratings that have been applied to the answer by other users of the question and answer service who have distributed a portion of their payments to the answer.

9. The system of claim 7, wherein the operations comprise, in response to receiving the payment, automatically deducting a portion of the payment for the question and answer service before initiating the timed interval.

10. The system of claim 7, wherein the operations comprise:
determining that (i) the timed interval has expired and (ii) the user has not specified a distribution of the entire portion of the payment among the selected answers; and
in response to determining that (i) the timed interval has expired and (ii) the user has not specified a distribution of the entire portion of the payment among the selected answers, crediting a portion of the payment for which the user has not specified a distribution to an account associated with the question and answer service.

11. The system of claim 7, wherein the operations comprise:
receiving one or more keywords entered by the user before exposing the answer set; and
exposing, to the user of the question and answer service, multiple questions matching one or more of the keywords entered by the user.

12. The system of claim 7, wherein, in addition to specifying the distribution of the portion of the payment among the selected answers, the one or more user inputs further specify rating for one or more of the selected answers.

13. A non-transitory computer-readable medium storing software comprising instructions executable by one or more computers which, upon such execution, cause the one or more computers to perform operations comprising:
identifying, by a question and answer service, a user-selected question from among a searchable database of questions;
exposing, to a user that selected the question, information about an answer set for the user-selected question,
wherein, before payment for the answer set is received from the user, the information about the answer set includes information specifying a number of answers in the answer set, and, for each answer in the answer set, a total monetary amount that other users of the question and answer service have distributed to the answer, and does not include the content of any answer in the answer set, and
wherein, after the payment for the answer set is received from the user, the information about the answer set includes the content of one or more answers in the answer set; and
in response receiving the payment for the answer set from the user, initiating a timed interval for receiving one or more user inputs that (i) select one or more answers from the answer set, and (ii) specify a distribution of a portion of the payment among the selected answers.

14. The medium of claim 13, wherein, before payment for the answer set is received from the user, the information about the answer set includes information specifying, for each answer in the answer set, an aggregated rating that is based on ratings that have been applied to the answer by other users of the question and answer service who have distributed a portion of their payments to the answer.

15. The medium of claim 13, wherein the operations comprise, in response to receiving the payment, automatically deducting a portion of the payment for the question and answer service before initiating the timed interval.

16. The medium of claim 13, wherein the operations comprise:
- determining that (i) the timed interval has expired and (ii) the user has not specified a distribution of the entire portion of the payment among the selected answers; and
- in response to determining that (i) the timed interval has expired and (ii) the user has not specified a distribution of the entire portion of the payment among the selected answers, crediting a portion of the payment for which the user has not specified a distribution to an account associated with the question and answer service.

17. The medium of claim 13, wherein the operations comprise:
- receiving one or more keywords entered by the user before exposing the answer set; and
- exposing, to the user of the question and answer service, multiple questions matching one or more of the keywords entered by the user.

* * * * *